US008398057B2

(12) United States Patent
Tukachinsky

(10) Patent No.: US 8,398,057 B2
(45) Date of Patent: Mar. 19, 2013

(54) STRINGING BLOCK FOR AERIAL ELECTRIC CONDUCTOR

(76) Inventor: Arie Leib Tukachinsky, Haifa (IL)

( * ) Notice: Subject to any disclaimer, the term of this patent is extended or adjusted under 35 U.S.C. 154(b) by 21 days.

(21) Appl. No.: 13/135,607

(22) Filed: Jul. 12, 2011

(65) Prior Publication Data

US 2013/0015419 A1 Jan. 17, 2013

(51) Int. Cl.
*H02G 1/02* (2006.01)

(52) U.S. Cl. ........................ 254/134.3 PA; 254/134.3 R

(58) Field of Classification Search ......... 254/134.3 PA, 254/134.3 R, 134.4
See application file for complete search history.

(56) References Cited

U.S. PATENT DOCUMENTS

| | | | | | |
|---|---|---|---|---|---|
| 3,853,304 | A | * | 12/1974 | Jackson | 254/394 |
| 3,868,089 | A | * | 2/1975 | Lindsey et al. | 254/134.3 PA |
| 4,201,369 | A | * | 5/1980 | Betta | 242/157 R |
| 4,301,994 | A | * | 11/1981 | Lindsey | 254/134.3 PA |
| 4,420,143 | A | * | 12/1983 | Harris | 254/134.3 PA |
| 4,632,364 | A | * | 12/1986 | Smith | 254/405 |
| 5,064,172 | A | * | 11/1991 | Hereford | 254/134.3 PA |
| 5,941,507 | A | * | 8/1999 | Page | 254/134.3 PA |
| 6,517,052 | B1 | * | 2/2003 | Lake | 254/134.3 PA |
| 6,540,207 | B1 | * | 4/2003 | Barnes | 254/134.3 R |

* cited by examiner

*Primary Examiner* — Lee D Wilson

(57) ABSTRACT

A stringing block for aerial electric conductor or other aerial cable, intended for hanging to electric line structures, insulators etc., suitable for both manual and helicopter pilot line or conductor stringing, is disclosed. The block comprises one or more ring-shaped sheaves, each one running over one or two small wheels, installed on a small size frame and rotating around their axes. The block is light enough for to prevent conductor/pilot line escaping the shave groove and friction on the shave flange.

9 Claims, 3 Drawing Sheets

STRINGING BLOCK FOR AERIAL ELECTRIC CONDUCTOR

FIELD OF THE INVENTION

This invention relates to stringing blocks for conductors installation at overhead electrical transmission and distribution lines or any other aerial cables installation.

BACKGROUND OF THE INVENTION

For pulling conductors at overhead transmission and distribution lines, stringing blocks are installed at the line structures. A pilot line is stringed through the blocks, either manually or by a helicopter. Then, the pilot line is exchanged by a single or bundled conductor, running on the blocks. Finally, the conductor is sagged and then transferred from the blocks to clamps.

The most of existing blocks consist of one or more sheaves, installed on an axle via bearings, the axle is supported by a frame, suitable for to be hanged to a line structure or an insulator. The frame is heavily loaded, especially at the blocks for helicopter stringing or for bundled conductor installation, and, accordingly, heavy weighting. Some kinds of stringing blocks are disclosed in the U.S. Pat. No. 4,018,422 by Bozeman, U.S. Pat. No. 4,129,287 and U.S. Pat. No. 4,301,994 by Lindsey.

A significantly lighter stringing block is disclosed in the U.S. Pat. No. 4,201,369 by Betta, but it doesn't support helicopter stringing.

At suspension structures with line angle not far from 180° (direct line), the block weight is less problematic: hard work for linemen. In contrast, at angle structures, the block, when stringing the pilot line, turns to an inclined position, and its weight is supported by the pilot line or conductor. It causes two main problems:

a) The relatively light pilot line has a tendency to escape the groove of a sheave of the stringing block. It also happens with light conductors, requiring big blocks, like optical ground conductor and other communication cables. The phenomenon is mentioned in the U.S. Pat. No. 4,420,143 by Lindsey and in the catalogue of Sherman & Reilly, Inc.

b) Conductor friction at the sheave flange takes place, causing the conductor damage.

One way to solve the problem of escaping the pilot line from the groove is fixing the block to the structure in an oblique position, rather than hanging it. A number of embodiments of this solution can be found in the catalogue of Sherman & Reilly, Inc. If the block installation angle is correctly calculated for given conductor weight and tension and line angle, it really solves the jumping problem. But since the weight of the pilot line is different from that of the conductor, and the tension is variable through the pulling process, fixing the block position exacerbates the second problem, increasing the conductor friction on the sheave flange.

Another way is disclosed in the U.S. Pat. No. 5,221,074 by Saracini. A plurality of small rolls, forming together a conductor route, similar to circumference of a single sheave, is used instead of the full-size sheave. These blocks are compact and relatively light. The suppliers of such kind of stringing blocks argue, that the conductor bending on these blocks is the same as on regular ones. But a dominant opinion is that the conductor is strongly bended and unbended on each single roll, and damaged; as a result, many conductor suppliers explicitly forbid using these blocks with their conductors.

One more way to solve this problem is disclosed in the U.S. Pat. No. 5,941,507 by Page. Two rolls are placed at the both sides of the sheave and accept the side pressure of the cable instead of the groove side. One problem with this block is that sensible cables cannot run on rolls (Page points that this block is intended for heavy cables). Another one is that it doesn't support helicopter stringing.

It would clearly be beneficial to provide a stringing block, intended for hanging to electrical line structures, insulators etc., suitable for both manual and helicopter pilot line or conductor stringing, of such a light weight, that said two problems will be solved.

SUMMARY OF THE INVENTION

It is an object of the invention to provide a stringing block, intended for hanging to electrical line structures, insulators etc., suitable for both manual and helicopter pilot line or conductor stringing, the block should be light enough for to prevent conductor/pilot line escaping the shave groove and friction on the shave flange. The invention achieves this by using a ring-shaped sheave, running over one or two small wheels, installed on a small size frame and rotating around their axles.

In accordance with the invention, there is provided a stringing block for aerial electric conductor, the stringing block comprising:

a frame, having a hanging means, at least one wheel mounted on said frame, being free to rotate around its axis, at least one sheave, substantially ring shaped, the outer surface of the shave is grooved, the groove profile suitable for stringing and pulling the conductor, and the inner surface of the shave is suitable to run over said at least one wheel, when the wheel is rotating around its axis.

This stringing block configuration enables a light weight frame with its centre of gravity close to the hanging point, and light weight shaves. Additionally, shifting of the block hanging point from the centre plane of the sheave groove helps to balance the moment of the net conductor tension at angle line structures. In combination, it solves said problems.

BRIEF DESCRIPTION OF THE DRAWINGS

In order to understand the invention and to see how it may be carried out in practice, some preferred embodiments will now be described, by way of non-limiting examples only, with reference to the accompanying drawings, in which.

In all the figures, similar components are identified by identical reference numerals or letters.

DETAILED DESCRIPTION OF PREFERRED EMBODIMENTS

Figure 1:
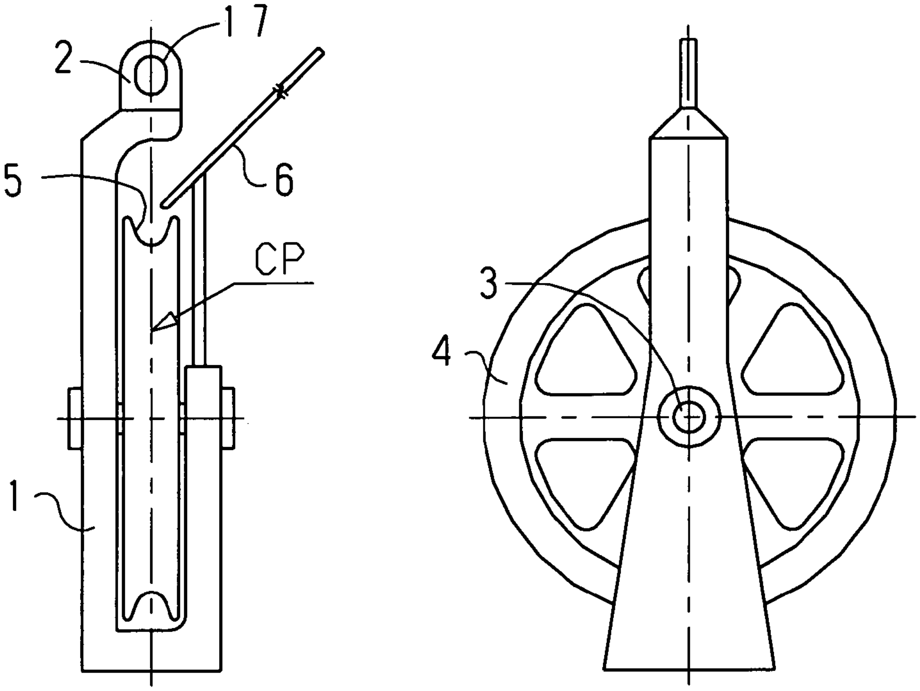
FIG. 1 shows a typical previous art stringing block, suitable for helicopter stringing, front and side views. Some details are omitted for clearness.

FIG. 1 shows a typical previous art stringing block, suitable for helicopter stringing, front and side views. Some details, insignificant for this description, are omitted for clearness. The block comprises a frame 1 with hanging means 2. An axle 3 is fixed to the frame 1 at its both ends. A shave 4 is mounted on the axle centrally via two bearings (not shown). The outer side of the shave is grooved; the groove profile 5 is suitable for stringing and pulling a single conductor. The hanging eye 17 is placed at the groove centre plane CP. A guide arm 6 is fixed at the open side of the frame for to accept a pilot line from a helicopter and direct it into the shave groove. When pulling the pilot line, and then the conductor, the shave rotates around the axle, and the conductor runs within the groove.

Figure 2:
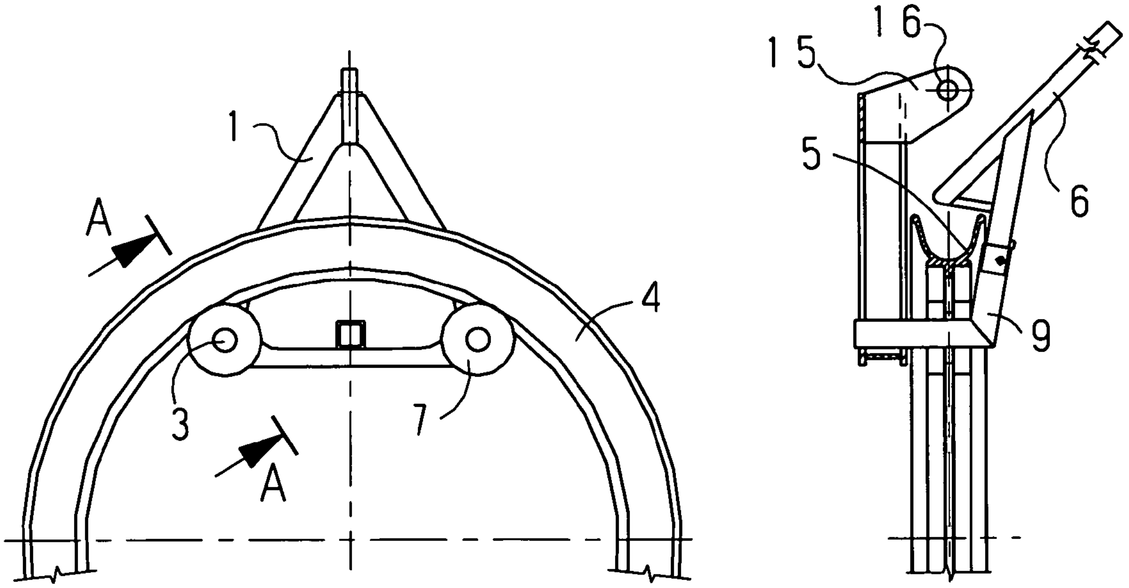
FIG. 2 shows a stringing block of the invention for single conductor, with two wheels and one shave, suitable for helicopter stringing, front and partial section side views.

FIG. 2 shows a stringing block in accordance to the current invention, front and side views. This block is also intended for a single conductor and suitable for helicopter stringing. A triangular frame 1 has a hanging arm 15 at its upper corner and two parallel axles 3, fixed to its bottom corners. A hanging hole 16 is placed at the hanging arm 15. A wheel 7 is mounted at each axle via a couple of bearings 8 (see FIG. 3), free to rotate around the axle. A ring shaped shave 4 is mounted over the two wheels 7. The outer side of the shave is grooved; the groove profile 5 is suitable for stringing and pulling a single conductor. A frame extension 9 is provided between the two wheels for installation of a guide arm 6, intended to accept a pilot line from a helicopter and direct it into the shave groove. It is clear, that both the frame and the sheave of the stringing block of FIG. 2 are much lighter than those of FIG. 1. When a pilot line or a conductor is running, being supported by the shave groove, the shave is rotating around its axis, running over the two wheels, which are rotating on their bearings. One wheel would be enough for this operation; the main advantage of the couple of wheels is less bending moment in the sheave. The triangular shape of the frame is especially advantageous when pulling a conductor with anti-twist tails: the side bars of the frame direct the tails into the shave groove.

Figure 3:
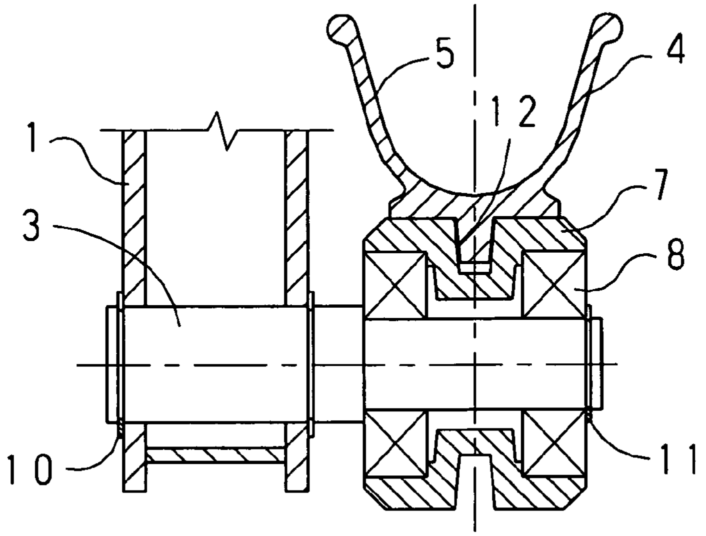
FIG. 3 is a section view of the block of FIG. 2, section A-A through one of the wheel axes.

FIG. 3 shows a partial cross-section of the block of FIG. 2 through the axis of one of the wheels. The axle 3 is mounted to the frame 1 by retaining rings 10. The wheel 7 is installed on the axle via two bearings 8 and protected against axial movement by a retaining ring 11. There is a groove 12 at the outer surface of the wheel, and the inner profile of the ring shaped sheave 4 is adjusted to the outer profile of the wheel. So, when pulling the conductor on the shave groove 5, the shave is running over the wheels 7, while the wheels are rotating around their axles 3.

Figure 4:
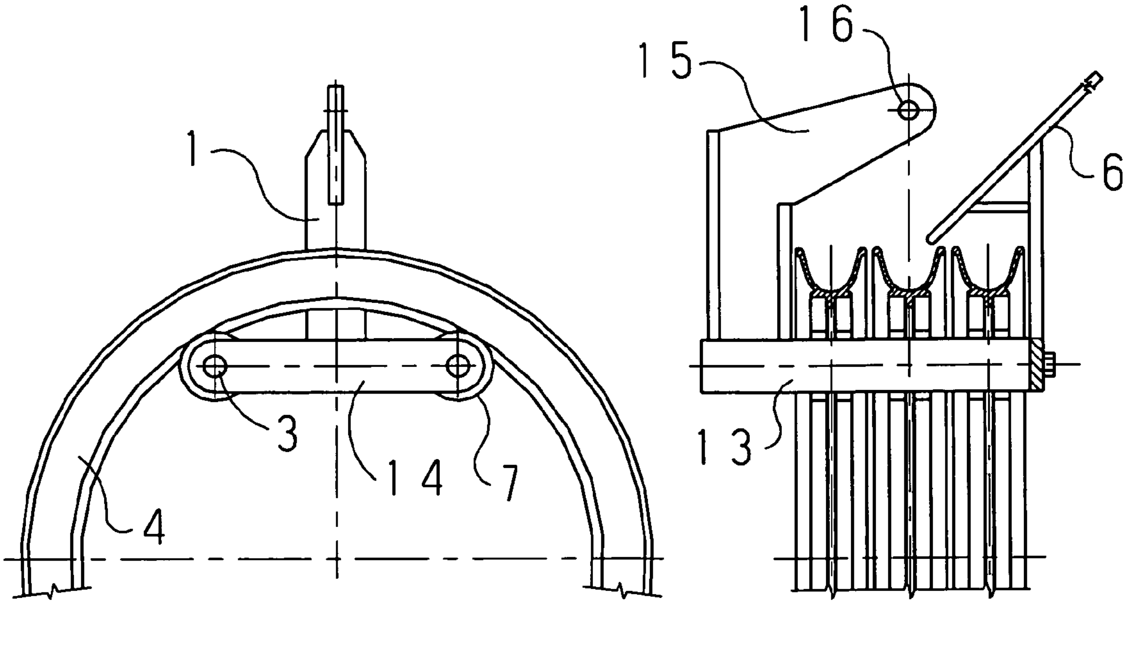
FIG. 4 shows a stringing block of the invention for bundle conductor, suitable for helicopter stringing, front and partial section side views.

FIG. 4 shows another kind of stringing block in accordance to the current invention, front and side views. This block is intended for a bundle conductor installation and is suitable for helicopter stringing. A T-shaped frame 1 has a hanging means 15, 16 at its upper end and two parallel axles 3, fixed to its bottom ends. Three wheels 7 are mounted at each axle via bearings (not shown), free to rotate around the axle. Three ring shaped shaves 4 are mounted, each one over a couple of the wheels 7. The outer side of each shave is grooved, each groove is suitable for pulling a single conductor. The inner side is adjusted to the wheel profile.

In the case of bundle conductor, the loading on the axles is much higher, both because of multiple loading by the wheels, and because their length. So, it is very beneficial to support them at the both ends. Intermediate supports between the wheels are also possible. In opposite to the block of FIG. 1, where the second end support requires a frame extension, passing around the shaves, here the frame extension 13 is placed between the axles and enables both second axles' support 14 and mounting the guide arm 6, intended to accept a pilot line from a helicopter and direct it into the groove of the middle shave. This stringing block is also light enough for to prevent escaping the pilot line from the groove at angle line structures.

An additional, to the block weight, cause of the conductor friction at the sheave flange can be the sheave groove profile. IEEE standard requires the groove bottom radius slightly bigger than the conductor radius. But frequently, especially with optical cables, additional devices, like swivel or anti-twisting tails, must be installed between the pilot line and the cable. So, the groove should be much wider, and the cable can run at a position, sufficiently shifted from the groove centre plane. As a rule, it happens at angle line structures.

Figure 5:
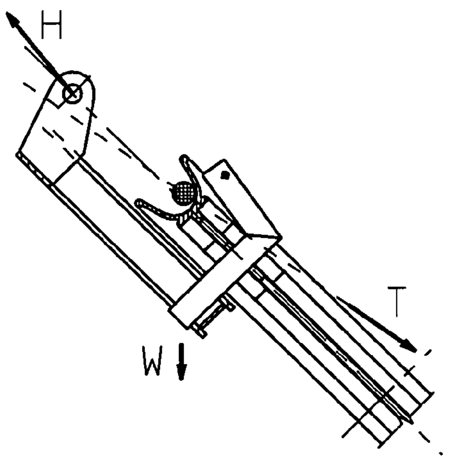
FIGS. 5, 6 show 2 schemes of the forces on a stringing block, hanged at an angle line structure (not shown). The scheme of FIG. 5 is for a block with centrally placed hanging means, and the scheme of FIG. 6 is for a block with hanging means, shifted from the groove centre plane.

At FIG. 5, the forces on a stringing block, hanged on an angular line structure by hanging means, placed at the groove centre plane CP, are shown. The net conductor tension T and the block weight W create moments around the hanging point. These two moments must compensate one another. It means that the block places itself so, that the plane CP is turned relatively to the tension T direction. A pressure is created between the conductor and the sheave flange, and when the conductor runs on the block—friction takes place, damaging the conductor.

With a sheave groove, significantly wider than the conductor diameter, the conductor runs aside the plane CP, CP is turned even harder, and the friction increase. Shifting the conductor in the groove produces a moment around the block hanging point in the same direction as the block weight. This moment, with the light block of the invention, can be comparable to that of the block weight, and even override it.

Figure 6:
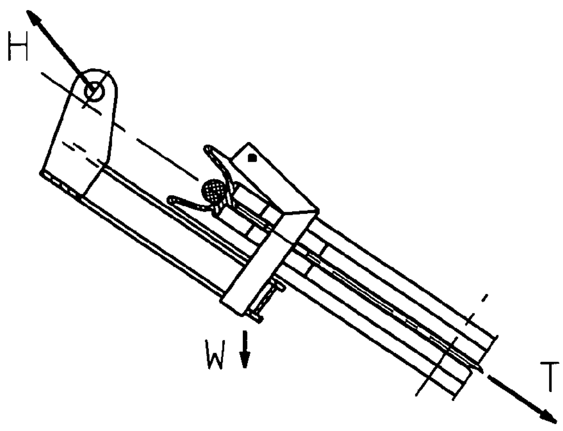
Figure 7:
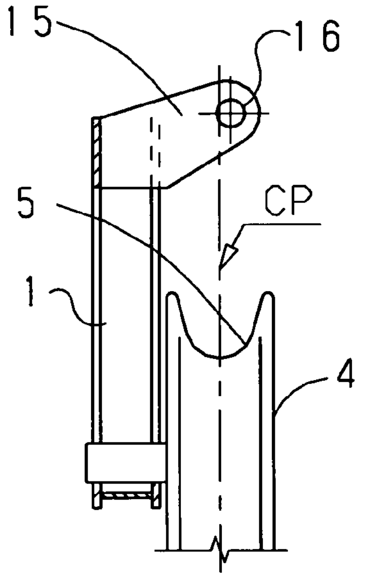
FIG. 7 is a partial front view of a stringing block with hanging means, shifted relatively to its groove centre plane.

At the stringing block of FIG. 7, the block hanging hole 16 is shifted from the groove centre plane CP in the direction of the line angle, in order to compensate said moment misbalance and reduce the friction. For the scheme of the forces on this block, see FIG. 6. In this case, the moments are balanced with no need in cable pressure on the sheave flange. The block slope is more than at FIG. 5 and is close to the slope of the cable tension plane. In real pulling work, the tension of the pilot line or cable is variable, and absolute balance of the moments is unreachable, but shifting the hanging point can minimize the side pressure and the cable friction.

Figure 8:
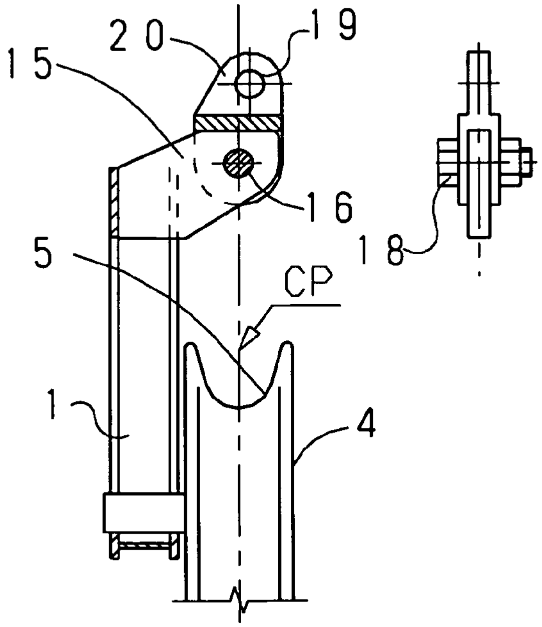
FIG. 8 shows a stringing block with hanging means, enabling shifted or non-shifted hanging on a line structure, partial front and side views.

FIG. 8 shows a stringing block, similar to those of FIG. 1 or 2, with centrally placed hanging hole 16, having additionally a hanging fork 20. This block enables both central hanging at suspension line structures, when the fork 20 is dismounted, and shifted hanging to any direction, according to the line angle, when the fork 20 is mounted to the hole 16 by a bolt 18.

It will be appreciated that the frame, the shaves and other stringing block components may be of different design, without departing from the scope of the invention as defined in the appended claims.

The invention claimed is:

1. A stringing block for an aerial electric conductor, the stringing block comprising:

a frame, having a hanging means, at least one wheel mounted on said frame, being free to rotate around its axis, at least one sheave, substantially ring shaped, the outer surface of the shave is grooved, the groove profile suitable for stringing and pulling the conductor, and the inner surface of the shave is suitable to run over said at least one wheel, when the wheel is rotating around its axis.

2. The stringing block according to claim 1, wherein an axle is connected to the frame, at least one of said wheels is mounted on the axle, and one said shave is installed on each one of the wheels, suitable to run over the wheel.

3. The stringing block according to claim 1, wherein two parallel axles are connected to the frame, an equal quantity of said wheels is mounted on each axle, and one said shave is installed on each couple of the wheels, mounted on different axles, the shave suitable to run over said couple of the wheels.

4. The stringing block according to claim 1, wherein at least one axle is connected to the frame, being supported by the frame at one end thereof, and at least one of said wheels is mounted on each axle.

5. The stringing block according to claim 1, wherein the frame has an extension, passing within said shaves, at least one axle is connected to the frame, being supported by the frame by at least two supports, and at least one of said wheels is mounted on each axle.

6. The stringing block according to claim 1, consisting further a means for reception of a pilot line from an aircraft and directing it into the appropriate shave groove, the connection between said means and the frame hanging means passes within the sheaves.

7. The stringing block according to claims 5, consisting further a means for reception of a pilot line from an aircraft and directing it into the appropriate shave groove, wherein said means is connected to said frame extension.

8. A stringing block, according to claim 1, characterized in that:

the hanging means of the frame are appropriate to hanging the block at a point, sufficiently shifted from the centre plane of the sheave groove.

9. A method of hanging a stringing block, according to claim 1, to an electric line structure, characterized in that:

the hanging point of the stringing block to the structure is sufficiently shifted from the centre plane of the sheave groove.

* * * * *